Dec. 25, 1923.
W. S. SAUNDERS
1,478,457
WINDSHIELD TOP SUPPORT
Filed Aug. 31, 1921
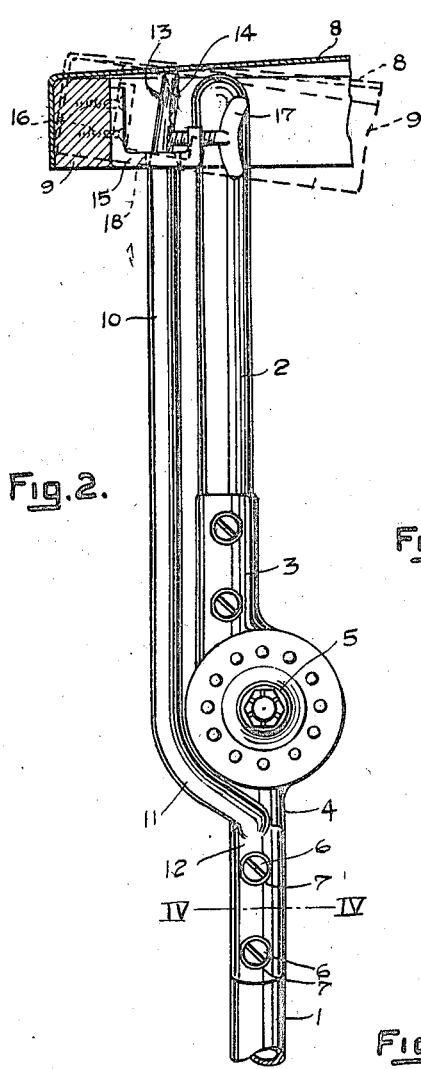
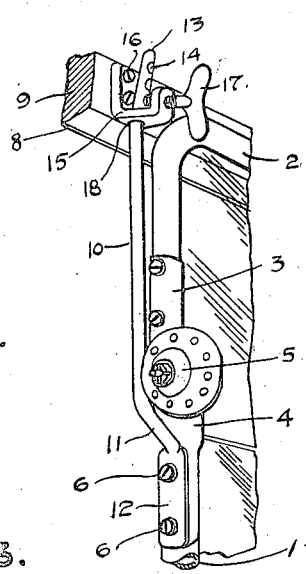
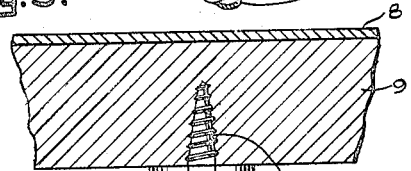
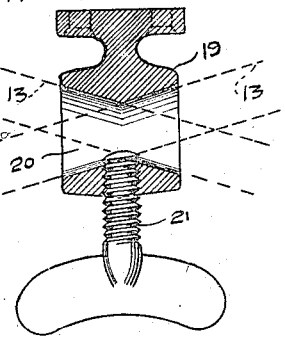
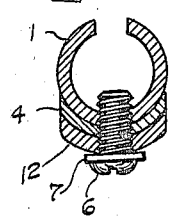
Inventor
Walter S. Saunders.
By
Attorneys Patented Dec. 25, 1923.

1,478,457

UNITED STATES PATENT OFFICE.

WALTER S. SAUNDERS, OF PONTIAC, MICHIGAN, ASSIGNOR TO AMERICAN FORGING AND SOCKET CO., OF PONTIAC, MICHIGAN, A CORPORATION OF MICHIGAN.

WINDSHIELD-TOP SUPPORT.

Application filed August 31, 1921. Serial No. 497,140.

*To all whom it may concern:*

Be it known that I, WALTER S. SAUNDERS, a citizen of the United States of America, residing at Pontiac, in the county of Oakland and State of Michigan, have invented certain new and useful Improvements in Windshield-Top Supports, of which the following is a specification, reference being had therein to the accompanying drawings.

A well known type of automobile depends on hold down straps for keeping the top of the automobile in set up position relative to the windshield of the automobile, and my invention aims to provide top supports that may be used in lieu of the holddown straps to provide a rigid, secure fastening for the front or outrigger bow of the automobile top, and thus eliminate rattling, swaying, the danger of accidents due to a top becoming unhooked on rough roads, and the destructive strap strain which quickly stretches the life out of top fabric.

My invention further aims to provide simple, durable and inexpensive top supports that may be easily and quickly installed without any alterations in the top or windshield construction, the supports including hardware that is applicable to a windshield and the front or outrigger bow of a "one-man" top.

My invention still further aims to provide top supports which will permit of a top being rigidly held at any angle the top may assume relative to a windshield; it being a well known fact that because of manufacturing imperfections no two tops will have like positions relative to a windshield. After a top has been in use for some time it will sag and assume a different angle from that of the top which is new, so in order that the front or outrigger bow of the top may be rigidly held, irrespective of its position relative to a windshield, the supports are made so that the top may be readily connected thereto.

My invention will be hereinafter described and then claimed, and reference will now be had to the drawing, wherein—

Figure 1 is a perspective view of one of the top supports showing its location on a windshield and its attachment to a portion of an automobile top;

Fig. 2 is a side elevation of the same, showing by dash lines how a top bow may have a tilted position relative to the support;

Fig. 3 is an enlarged plan of a top bracket as secured to a top bow;

Fig. 4 is a vertical longitudinal sectional view of a modified form of top bracket or socket, showing by dash lines how the socket may be held relative to a support even though the socket should be tilted;

Fig. 5 is a front elevation of a portion of a windshield showing that two supports are employed for holding the top, and Fig. 6 is an enlarged horizontal sectional view taken on the line VI—VI of Fig. 2.

In order that the use and manner of installing the top supports may be understood, there is shown in the drawing a portion of a windshield 1 having an adjustable top section 2 which is held and may be adjusted by the usual upper and lower hinge members 3 and 4 frictionally connected together, as at 5, said hinge members being connected to the frames of the windshield by screws 6 and washers 7.

Extending over the adjustable section 2 of the windshield is the front end of an automobile top 8 which includes the front or outrigger bow 9, and as pointed out in the beginning this front or outrigger bow 9 is ordinarily held in a defined position relative to the windshield by holddown straps, which I intend to eliminate and provide more positive means for holding the front end of the top relative to the windshield. The means which I employ for this purpose consists of practically four pieces of hardware, two of which are attached to the windshield and the remaining two to the front bow 9 of the top 8. The windshield hardware comprises supports or rods 10 having the lower ends thereof offset, as at 11, to provide clearance for the windshield hinges, so that the lower ends of said supports may be attached to the windshield, below the hinges thereof, with the upper ends of the supports in a plane in front of the windshield. In order that the lower ends of the supports may be conveniently attached to the windshield, said supports have apertured plates 12 at the lower ends thereof, said plates being dished or channeled so as to fit against the lower hinge members 4 of the windshield and be connected thereto by the screws 6 and the washers 7. This obviates the necessity of providing additional fastening means for clamping the supports in position.

The upper ends of the supports 10 are reduced and bent to provide angularly disposed somewhat tapered stems 13 provided with a plurality of screw seats or notches 14.

The top hardware for the bow 9 comprises L-shaped brackets 15 having long legs thereof connected by screws 16 or other fastening means to the inner wall or face of the bow 9, and the short legs of said brackets have adjustable thumb screws 17. The brackets 15 are provided with openings 18 to receive the stems 13 and permit of the upper ends of the supports 10 extending through said brackets. The thumb screws 17 may engage in the seats 14 of the stems 13 and hold the brackets 15 in a fixed position relative to the support. With the openings 18 of a proper and defined diameter the brackets 15 may assume an angular relation, other than that of a right angle, to the supports 10 and this has been brought out by dash lines in Fig. 2. The angular relation of the stems 13 relative to the supports 10 permits of the brackets 15 being placed down over the stems 13 as the front or outrigger bow 9 is lowered, when setting up a "one-man" automobile top. It will be noted that the stems 13 are inclined rearwardly from the plane of the supports 10 and when lowering a new top, should the bow 9 not assume a horizontal position, but be tilted at an angle the reverse of that shown by dash lines, then the thumb screws 17 may engage in some of the uppermost seats 14 of the stems 13, and as the new top stretches or starts to sag, due to use, it may be more firmly clamped by being lowered on the stems 13 to the position shown in Fig. 2.

As a substitute for the brackets 15, I may use sockets 19 Fig. 4, having openings 20 provided with flared ends which will permit of the sockets assuming an angular relation to the stems 13 or just ordinary upper ends of the supports 10. The sockets 19 are provided with thumb screws 21 so that the sockets may be fixed to the supports when properly adjusted.

Since the windshield and top of the well known automobile to which my top supports are applicable may be changed, I reserve the right to make such changes in the hardware entering into my invention, as are permissible by the appended claims.

What I claim is:—

1. The combination of an automobile top, brackets carried thereby, said brackets having openings therethrough provided with flared ends and all of the opening walls integral with said brackets, thumb screws intermediate the flared ends of the bracket openings, and supports for said top adapted to be held by said brackets, said supports having extremities adapted to extend through the bracket openings and permit of said brackets being tilted relative to said supports and secured in such tilted positions by said thumb screws.

2. As a new article of manufacture, a top bracket for a top support, said bracket having intersecting openings with the axes of said openings at an acute angle to each other and providing integral opening walls converging to the central portion of said bracket with a portion of the wall of one opening adapted to cooperate with a portion of the wall of the other opening in engaging a top support, and a screw at the inner ends of said bracket openings adapted to engage and retain a top support in said bracket.

In testimony whereof I affix my signature in presence of two witnesses.

WALTER S. SAUNDERS.

Witnesses:
 CHAS. W. STAUFFIGER,
 KARL H. BUTLER.